(12) United States Patent
Jenum

(10) Patent No.: US 6,443,499 B1
(45) Date of Patent: Sep. 3, 2002

(54) APPARATUS FOR PRE-CONDITIONED AIR HOSES AND A METHOD OF ASSEMBLING PRE-CONDITIONED AIR HOSES

(75) Inventor: Wayne Jenum, Glenwood, MN (US)

(73) Assignee: Quadro Corporation, Glenwood, MN (US)

( * ) Notice: Subject to any disclaimer, the term of this patent is extended or adjusted under 35 U.S.C. 154(b) by 0 days.

(21) Appl. No.: 09/794,680

(22) Filed: Feb. 27, 2001

(51) Int. Cl.[7] ............................................... F16L 31/00
(52) U.S. Cl. ......................... 285/260; 285/48; 285/53; 285/55
(58) Field of Search .............................. 285/33, 48, 53, 285/55, 222.1, 260, 308, 417

(56) References Cited

U.S. PATENT DOCUMENTS

| | | | | |
|---|---|---|---|---|
| 2,595,408 A | * | 5/1952 | Quest | ........................ 285/260 |
| 4,807,669 A | * | 2/1989 | Prestidge, Sr. | ............... 285/53 |
| 5,368,341 A | | 11/1994 | Larson | |
| 6,286,876 B1 | * | 9/2001 | Jasperse et al. | ............. 285/260 |

* cited by examiner

Primary Examiner—Lynne H. Browne
Assistant Examiner—Aaron Dunwoody
(74) Attorney, Agent, or Firm—Merchant & Gould PC

(57) ABSTRACT

The present invention provides an apparatus for pre-conditioned air (PCA) hoses and an assembly for a plurality of PCA hoses. The present invention further provides a method of assembling a plurality of PCA hoses. A hose in the assembly has an outer vinyl layer and further an insulative layer and an inner antibacterial layer. Hook and loop fasteners are employed to provide a way for attaching and securing junctions between hoses in the assembly, where two ends are butted together to form one of the junctions. The two ends each have a first portion of the hook and loop fastener attached substantially about the circumference of the hose. An elongated member having a second portion of the hook and loop fastener is attached at one of the ends where it is effective for wrapping about the circumference of the hoses thereby connecting and covering the butted junction between hoses.

16 Claims, 3 Drawing Sheets

APPARATUS FOR PRE-CONDITIONED AIR HOSES AND A METHOD OF ASSEMBLING PRE-CONDITIONED AIR HOSES

FIELD OF THE INVENTION

This invention relates to pre-conditioned air (PCA) hoses and more particularly to an apparatus for a PCA hose, to an assembly of PCA hoses, and further to a method for assembling a plurality of PCA hoses. Specifically, this invention relates to PCA hoses for servicing aircraft.

BACKGROUND OF THE INVENTION

When an aircraft is at a terminal at rest with the engines off pre-conditioned air is blown into the ventilating system of the aircraft from a heating or air conditioned grounded system so that passengers may board and await take off comfortably. An assembly of PCA hoses is used to deliver pre-conditioned air from the ground source to the aircraft.

Previous PCA hose assemblies have employed various laminated materials of varying lengths to accommodate aircraft. Past examples have connected these hoses with zipper fasteners. However, these laminated materials are not durable as they become susceptible to weathering and peeling. Further the fastening means of zipper fasteners between hoses is cumbersome to connect, especially in the event that service providers and handlers are wearing gloves in cold weather or in other non-accommodating weather conditions making it hard to manipulate the zippers. In addition, after being repeatedly run over in the field, zipper fasteners of these hoses often break, and must be replaced, as repair means such as duct tape are not satisfactory.

U.S. Pat. No. 5,368,341 to Larson discloses a hose assembly for connecting a plurality of vinyl coated hoses with hook and loop tape fasteners. Larson employs hoses having two ends where a first end is received by a second end having a pair of oppositely opposed slits, allowing the first end of one hose to enter the second end of another hose in a telescoping manner. However, this type of assembly does not provide a very convenient and easy method for handlers to attach PCA hoses, and may allow leakage through the junction points. Larson's configuration complicates a method for assembling PCA hoses as the handlers may have trouble manipulating the ends of these hoses in attempting to secure attachment between them.

Still a hose assembly is being sought to provide a cost effective, durable hose and method for assembly. The present invention overcomes the shortcomings of the prior hoses providing an assembly with favorable PCA hoses, and a method for efficient and easy attachment.

SUMMARY OF THE INVENTION

The present invention provides an apparatus for a pre-conditioned air (PCA) hose. The present invention provides an assembly for a plurality of PCA hoses. The present invention further provides a method for assembling a plurality of PCA hoses. The present invention allows aircraft service providers and handlers to conveniently attach a plurality of hoses in assembling a system of hoses. The assembly of the present invention prevents leakage through junctions between hoses in the assembly.

In one embodiment, a pre-conditioned air hose comprises first and second ends having a first portion of a hook and loop fastener attached onto and substantially about the circumference of the air hose. An elongated member having a second portion of a hook and loop fastener may be attached proximate one end to a sidewall proximate the first end of the air hose. The elongated member at least partially overlaps the first portion of the hook and loop fastener attached onto the first end of the air hose. Further, the elongated member may have a length extendable substantially about the circumference of the air hose and a width projecting beyond the first end of the air hose. A first connective site is provided for the first end of an air hose and the second end of another air hose to connect with the elongated member. Also, a second connective site is provided for the elongated member to wrap on itself.

In another embodiment, a pre-conditioned air hose assembly comprises a plurality of pre-conditioned hoses joined together by hook and loop fasteners. Each hose comprises a first end and a second end having a first portion of a hook and loop fastener attached onto and substantially about a circumference of the first end and the second end of each hose. An elongated member having a second portion of a hook and loop fastener may be attached proximate one end to a sidewall proximate the first end of each hose, the elongated member at least partially overlaps the first portion of the hook and loop fastener attached onto the first end of each hose. The elongated member may have a length extendable substantially about the circumference of the first end of each hose and a width projecting beyond the first end of each air hose. Further, a butted junction between two said hoses contains the second end and the first end with the elongated member wrapped substantially about the circumference of both ends of the butted junction. A first connective site may allow for the elongated member to attach to both first and second ends of an air hose. Also, a second connective site may provide for the elongated member to wrap onto itself.

In yet another embodiment, a method for attaching a plurality of pre-conditioned air hoses comprises sewing a band of a first portion of a hook and loop fastener substantially onto and around a circumference of a first end and a second end of each hose. An elongated member having a second portion of a hook and loop fastener may be attached onto a width and a sidewall proximate the first end of each hose. The elongated member may overlap onto a portion of the first end and projects a width beyond the first end of each hose. The first end of one hose having the sewn band substantially around the circumference and the elongated member connected is butted against the second end of another hose having the sewn band substantially around the circumference. Further, the elongated member may be wrapped substantially about the circumference of the butted ends such that the first and second hose ends with the first portion of a hook and loop fastener face and secure each other with the elongated member having the second portion of a hook and loop fastener.

The advantages and features of the novel invention are pointed out with particularity in the claims annexed hereto and forming a part thereof. However, for a better understanding of the invention and its advantages and objectives attained, reference should be made to the drawings which form a further part hereof, and to the accompanying description, in which there is described the preferred embodiments of the invention.

DESCRIPTION OF THE PREFERRED EMBODIMENT

Figure 1:
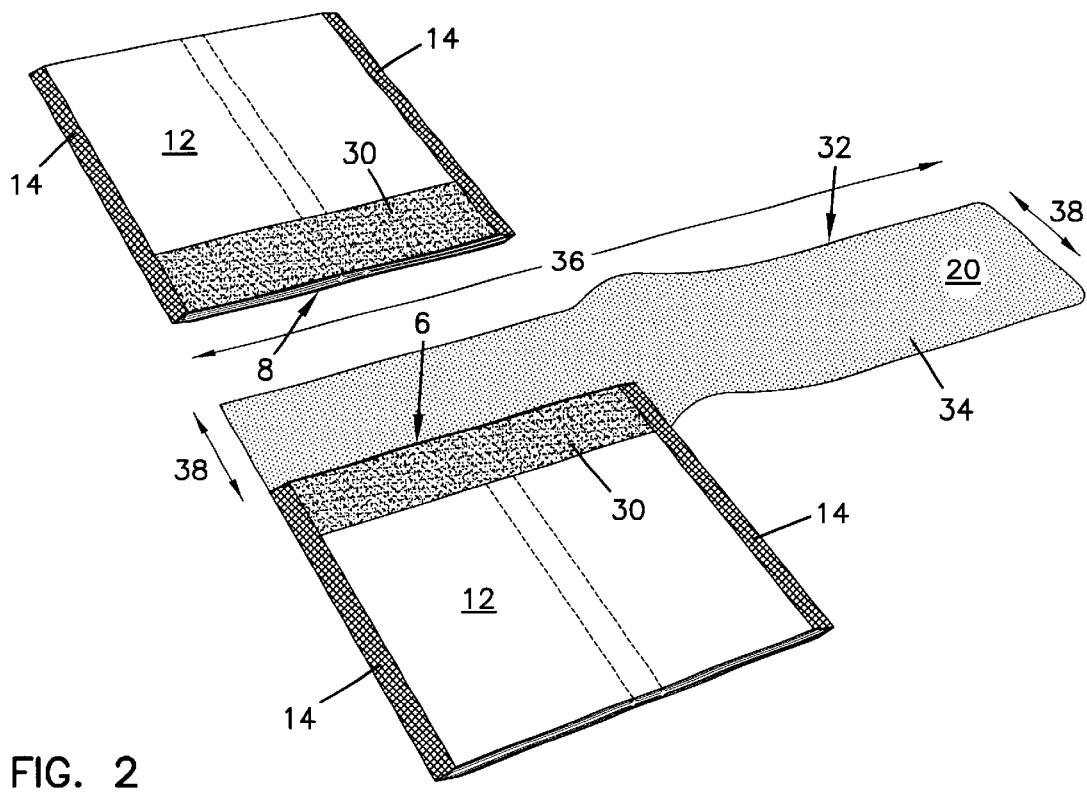
FIG. 1 is a diagrammatical view of an embodiment for pre-conditioned air hoses in accordance with the principles of the present invention showing the first end of one hose with an elongated member attached and the second end of another hose.

Referring now to the drawings, with reference to FIG. 1, a preferred embodiment for a pre-conditioned air (PCA) hose of the present invention is described as numeral 12. A first end 6 of a hose 12 and a second end 8 of another hose 12 each have a first portion of a hook and loop fastener 30 attached onto and around each hose 12. This first portion 30 may be, but is not limited to, a sewn band onto and substantially about the circumference of each hose 12. The sides 14 of the hose may provide structural connection of the hose materials. An elongated member 20 may be attached onto a sidewall proximate the first end 6 of the air hose 12 overlapping onto the portion of the hose 12 having first portion of the hook and loop fastener 30. The elongated member 20 is provided with a second portion of a hook and loop fastener 34. The elongated member 20 may have a length 36 that is extendable about the circumference of the hose 12 and a width 38 projecting beyond the first end 6. A hose 12 may have the first end 6 and the second end 8, and hoses 12 in an assembly 10 are connected at the first end 6 of one hose 12 and the second end 8 of another hose 12 (described in FIGS. 2-4 below). Further the elongated member 20 has a first side 32 containing the second portion of the hook and loop fastener 34. This first side 32 faces toward the hose 12 when the elongated member 20 is attached.

Figure 2:
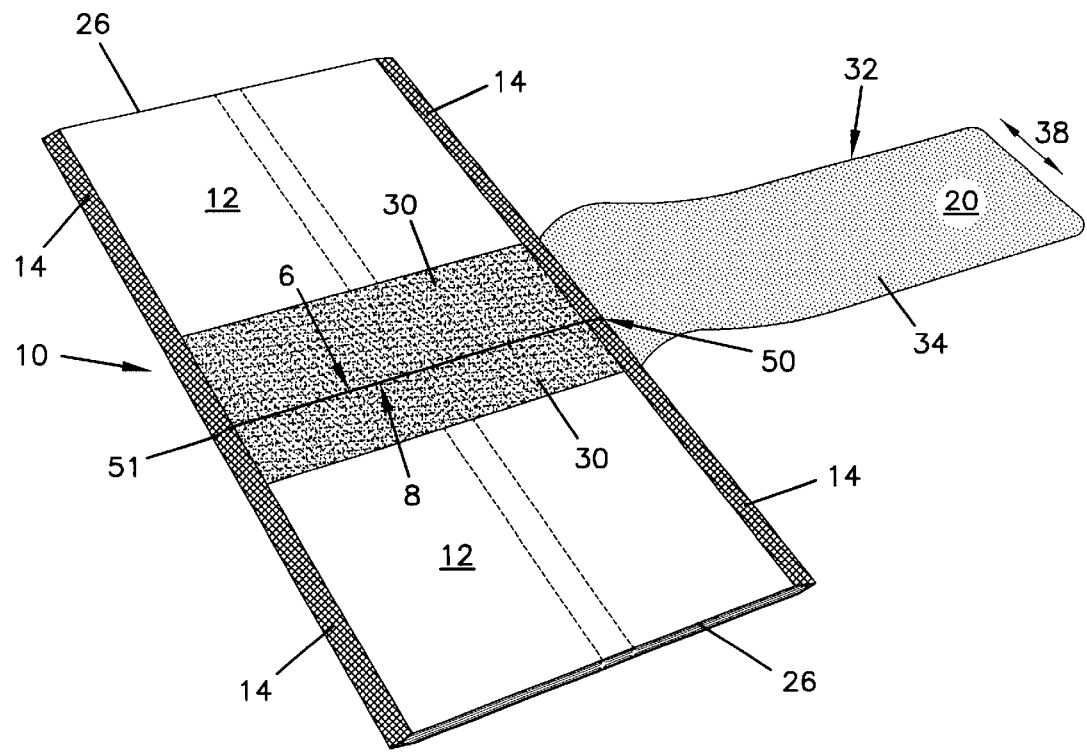
FIG. 2 is a diagrammatical view of an embodiment for a hose assembly in accordance with the principles of the present invention showing the hoses of FIG. 1 aligned and abutting each other at the first end of one hose with an elongated member attached and the second end of the other hose.
Figure 3:
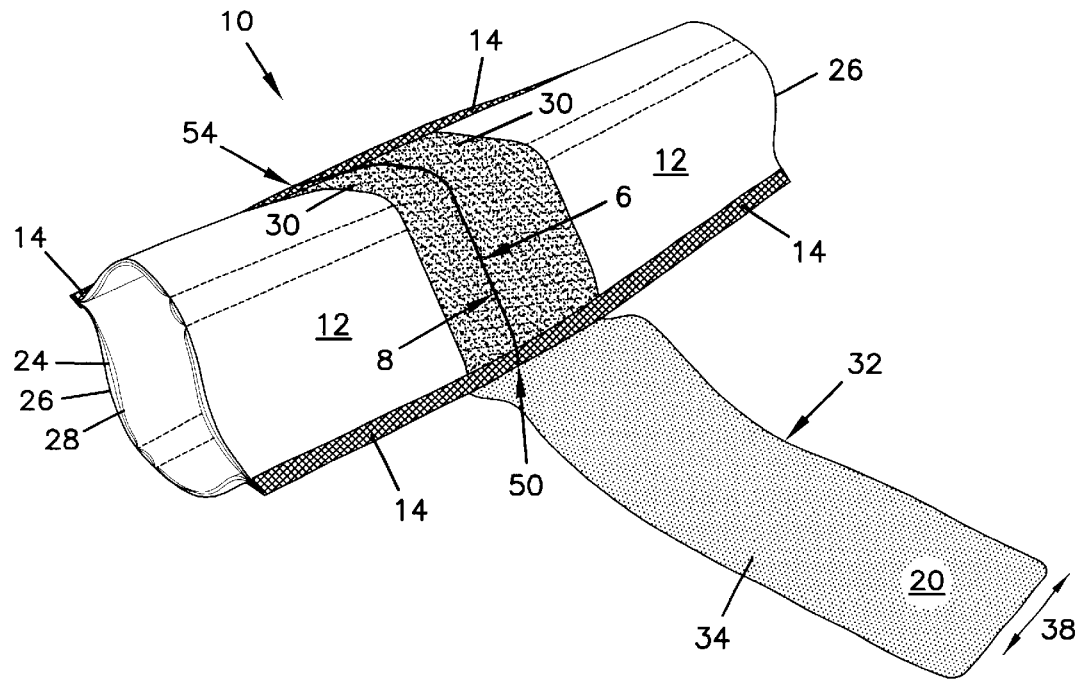
FIG. 3 is a perspective cross-sectional view of the hoses of FIG. 1 further showing the hoses aligned and connected of FIG. 2, and also the layers of one hose in the assembly.
Figure 4:
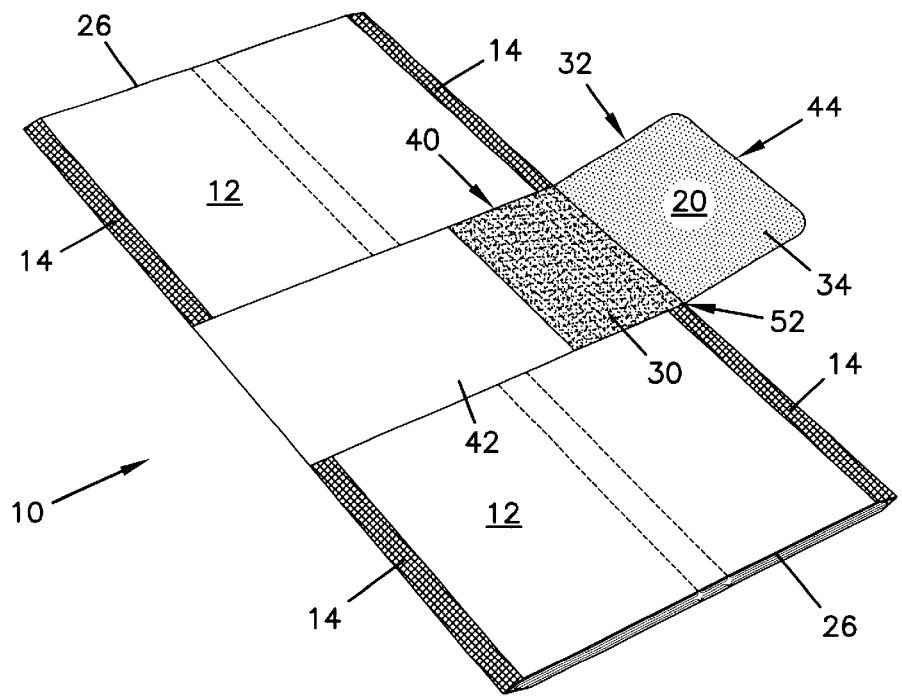
FIG. 4 is a diagrammatical view of an embodiment for a method of assembling the hoses of FIG. 1 where the elongated member is being wrapped around the circumference of both hoses, and further showing a point of connection for the elongated member on itself.

FIGS. 2, 3 and 4 refer to an embodiment of a method of attaching a plurality of PCA hoses 12. As shown in FIGS. 2 and 3, the hoses 12 of FIG. 1 are now aligned and connected at a first connective site 50 forming a hose assembly 10 where the first end 6 having the elongated member attached as described in FIG. 1 and the second end 8 are substantially flush with each other. As best shown in FIGS. 2 and 3, the second end 8 is aligned with the first end 6, and the second end 8 with its first portion of the hook and loop fastener 30 affixed substantially about the circumference of the hose 12 is connected onto the width 38 of the elongated member 20 that projects beyond the first end 6 of the other hose 12. The first end 6 and the second end 8 are butted against each other at the butted junction 54 where the elongated member 20 attached to the first end having the projected width 38 beyond the first end connects with the second end 8. The butted ends 6 and 8 form the butted junction 54 where the ends 6 and 8 are substantially flush with each other. FIG. 3 further shows a cross-sectional view of a hose 12 where the hose 12 is composed of three layers. The three layers include an outer vinyl layer 26, an insulative layer 24, and an inner anti-bacterial layer 28. The outer vinyl layer 26 provides sufficient structural support of the hose 12, and gives adequate strength and flexibility. The hose assembly can include a diameter of 8–14 inches for each hose.

FIG. 4 refers to the hose assembly 10 with the elongated member 20 wrapped mostly about the circumference of the butted hoses 12. Further an end tab 40 located on a second side 42 of the elongated member 20 also has the first portion of the hook and loop fastener 30 attached at the end tab 30. This second side 42 and tab 40 face away from the hose and are opposite the first side 32. A overlapping portion 44 on the first side 32 of the elongated member 20 having the second portion of the hook and loop fastener 34 is not yet wrapped around the butted hoses 12. The end tab 40 with the first portion of the hook and loop fastener 30 of the second side 42 and overlapping portion 44 with the second portion of the hook and loop fastener provide for a second connective site 52. This second connective site allows the elongated member 20 to wrap around the butted junction 54 to secure the first connective site 50 of the butted hoses 12 when the elongated member 20 is fully wrapped about the circumference of the connected hoses 12 in the hose assembly 10.

Figure 5:
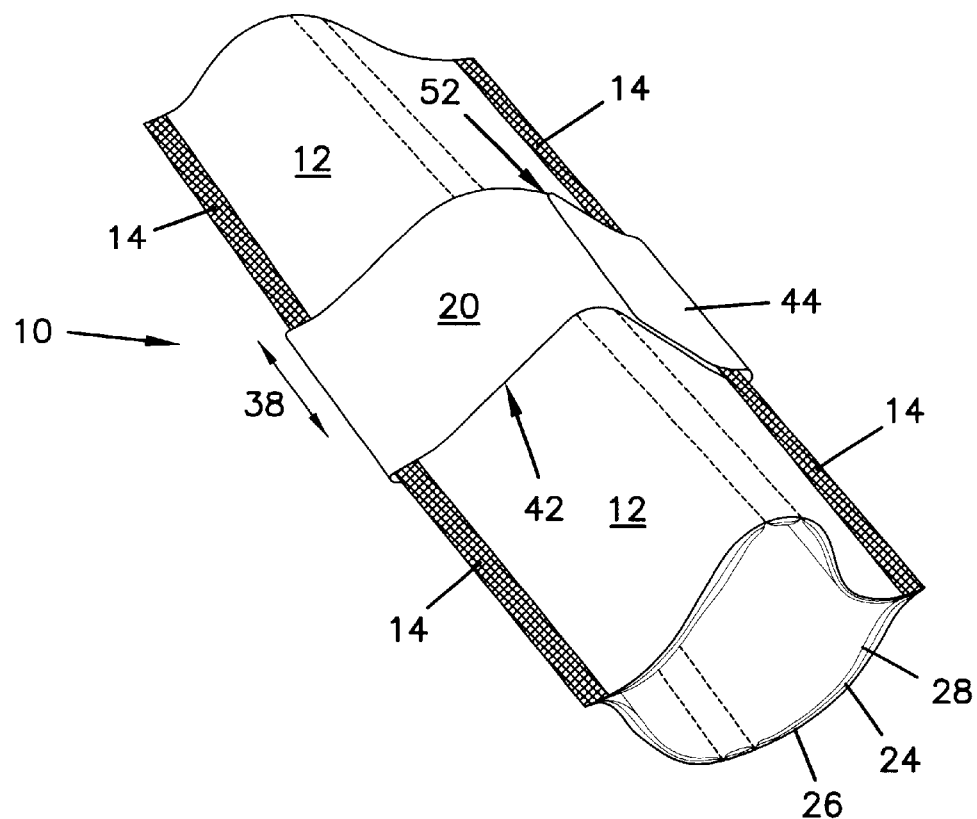
FIG. 5 is a cross-sectional view of a portion of the hose assembly where the hoses of FIG. 1 are attached and connected.

As depicted in FIG. 5, the hoses 12 are connected with the elongated member 20 being wrapped around the circumference of the hose assembly 10. The second side 42 of the elongated member 20 is shown with the overlapping portion 44 now attached over the end tab 40 (not shown). The elongated member 20 has the length 36 that is effective for covering the entire circumference of the butted hoses 12 in the hose assembly 10, including the sides 14. No air leakage should occur as the butted junction 54 has flush ends 6 and 8 and is substantially covered by the elongated member 20 to prevent air leakage. The hook and loop fastener provide a strong connection between hoses. This configuration of assembling hoses simply provides an efficient and easy method of aligning a second hose end to a first hose end and wrapping a belt like elongated member around the circumference of a butted junction. The hook and loop fasteners may be run over repeatedly without being damaged, and the durable outer vinyl layer provides adequate strength and protection while being flexible.

It is to be understood that while certain embodiments of the present invention have been illustrated and described, the invention is not limited to the specific forms and arrangements of the parts described and shown.

I claim:

1. A pre-conditioned air hose, comprising:
   first and second ends of the air hose having a first portion of a hook and loop fastener attached onto and substantially about a circumference of the air hose, and
   an elongated member, having a second portion of a hook and loop fastener, attached proximate one end to a sidewall proximate the first end of the air hose, the elongated member at least partially overlapping the first portion of the hook and loop fastener attached onto the first end of the air hose, the elongated member further having a length extendable substantially about the circumference of the air hose and a width projecting beyond the first end of the air hose, wherein the elongated member further comprises the second portion of the hook and loop fastener positioned on a first side of the elongated member such that the first side faces toward the hose when the elongated member is attached to the hose.

2. A pre-conditioned air hose according to claim 1, further comprising a first connective site for the first and second ends of the air hose having the first portion of the hook and loop fastener to connect with the elongated member having the second portion of the hook and loop fastener.

3. A pre-conditioned air hose according to claim 1, wherein the elongated member further comprises a first portion of a hook and loop fastener positioned on an end tab of a second side of the elongated member such that the second side faces opposite the first side of the elongated member and away from the hose when the elongated member is attached.

4. A pre-conditioned air hose according to claim 3, further comprising a second connective site for the first side of the elongated member having the second portion of the hook and loop fastener to connect with the end tab of the second side of the elongated member having the first portion of the hook and loop fastener.

5. A pre-conditioned air hose according to claim 1, further comprising three layers including an antibacterial inner layer, an insulative layer, and an outer vinyl coated layer.

6. A pre-conditioned air hose according to claim 1, further comprising a diameter of 8–14 inches.

7. A pre-conditioned air hose assembly comprising:
    a plurality of pre-conditioned air hoses joined together by hook and loop fasteners; wherein,
    each hose comprises a first end and a second end having a first portion of a hook and loop fastener attached onto and substantially about a circumference of the first end and the second end of each hose; and further,
    an elongated member having a second portion of a hook and loop fastener attached proximate one end to a sidewall proximate the first end of each hose, the elongated member at least partially overlapping the first portion of the hook and loop fastener attached onto the first end of each hose, the elongated member having a length extendable substantially about the circumference of the first end of each hose and a width projecting beyond the first end of each air hose; and
    a butted junction between two said hoses wherein said butted junction contains said second end and said first end with said elongated member wrapped substantially about the circumference of both ends of the butted junction, wherein the elongated member further comprises the second portion of the hook and loop fastener positioned on a first side of the elongated member such that the first side faces toward the hose when the elongated member is attached.

8. A pre-conditioned air hose assembly according to claim 7, wherein the butted junction further comprises a first site for connection between said hoses for said first and second ends of the air hose having the first portion of the hook and loop fastener to connect with the elongated member having the second portion of the hook and loop fastener.

9. A pre-conditioned air hose assembly according to claim 7, wherein the elongated member further comprises a first portion of a hook and loop fastener positioned on an end tab of a second side of the elongated member such that the second side faces opposite the first side of the elongated member and away from the hose when the elongated member is attached to the hose.

10. A pre-conditioned air hose assembly according to claim 9, further comprising a second connective site for the first side of the elongated member having the second portion of the hook and loop fastener to connect with the end tab of the second side of the elongated member having the first portion of the hook and loop fastener.

11. A pre-conditioned air hose assembly according to claim 7, further comprising three layers for each hose including an antibacterial inner layer, insulative layer, and outer vinyl coated layer.

12. A pre-conditioned air hose assembly according to claim 7, further comprising a diameter of 8–14 inches for each hose.

13. A method of attaching a plurality of pre-conditioned air hoses comprising:
    sewing a band of a first portion of a hook and loop fastener substantially onto and around a circumference of a first end and a second end of each hose;
    attaching an elongated member with a second portion of a hook and loop fastener onto a width and a sidewall proximate the first end of each hose; and
    overlapping the attached elongated member onto a portion of the first end and projecting a width beyond the first end of each hose; and
    butting the first end of one hose having the sewn band substantially around the circumference and the attached elongated member against the second end of another hose having the sewn band substantially around the circumference; and further,
    wrapping the elongated member substantially around the circumference of the butted ends such that the first portion of a hook and loop fastener of the first and second hose ends face and secure each other with the second portion of the hook and loop fastener of the elongated member.

14. A method of attaching a plurality of pre-conditioned air hoses according to claim 13, wherein the step of butting the first end and the second end further comprises aligning the butted ends together such that there is a substantially flush connection between the ends.

15. A method of attaching a plurality of pre-conditioned air hoses according to claim 13, further positioning an end tab on a second side of the elongated member having a first portion of a hook and loop fastener such that the second side faces opposite the first side of the elongated member and away from the hose when the elongated member is attached.

16. A method of attaching a plurality of pre-conditioned air hoses according to claim 13, further providing a connective site for the first side of the elongated member having the second portion of the hook and loop fastener to connect with the end tab of the second side of the elongated member having the first portion of the hook and loop fastener.

* * * * *